3,676,149
TASTE-MODIFYING COMPOSITION CONTAINING MIRACULIN AND METHOD OF PREPARATION
John Richard Fennell and Robert J. Harvey, Sudbury, Mass., assignors to Meditron, Inc., Wayland, Mass.
No Drawing. Filed Apr. 15, 1970, Ser. No. 28,981
Int. Cl. A23l 1/22
U.S. Cl. 99—140 R                15 Claims

ABSTRACT OF THE DISCLOSURE

Stable solid miraculin substantially free of components of ripe miracle fruit that degrade miraculin. The miraculin is useful in conjunction with foods such as in coatings to render sour-tasting foods sweet tasting while maintaining this taste modifying characteristic for long periods under normal atmospheric conditions. The miraculin is obtained by low temperature procesing including comminuting the ripe fruit, dehydration, and separation on a density basis.

---

This invention realtes to a stable taste-modifying composition and to its method of preparation.

*Synsepalum dulcificum* Daniell, Sapotaceae is a plant indigenous to West-Central Africa which bears a red ellipsoid fruit commonly known as "miracle fruit." The fruit has a palatable pulp and skin and contains a large seed. It is characterized by a pleasant taste and by the unique property, well-recognized for over 200 years, of modifying the sweet and sour tastes in an unusual manner. It has been found that a component in the fruit depresses the sour taste and accentuates the sweet taste of any normally sour food eaten within a short period after first contacting the tongue with the pulp of fresh miracle fruit, thus causing the normally sour food to taste pleasantly sweet. By exposing the taste receptors on the tongue to miracle fruit, any sour tasting food can be made to taste sweet without the addition of sugar or artificial sweeteners. For example, fresh lemon can be made to taste pleasantly sweet by first eating a miracle fruit berry. The taste-modifying principle in the miracle fruit berry known as miraculin binds itself to the taste receptors thus altering the sensory perception of the sour taste in foods eaten after the miracle fruit.

It has been determined that miraculin is a glycoprotein having a molecular weight of about 44,000. A wide variety of approaches have been explored in attempts to isolate the active component in miracle fruit for subsequent use as a taste-modifying material. These attempts have met with only limited success since the form of the product obtained by these methods is effective than the natural fruit, and was found to be highly unstable at normal room temperatures under normal atmospheric conditions. This instability necessitated either very quick use after isolation or storage at very low temperatures.

The prior art has regarded miraculin as a very labile material accounting for the observed instability of concentrates maintained at normal room temperatures. While some degree of success has been attained in improving stability of the miraculin-containing material in the order of about a week or so, it has been found that its stability could not be achieved when maintained in powder form at room temperatures. Alternatively, the miraculin-containing material was dissolved in specific solvents maintained at a specific pH. These solutions had to be refrigerated to be preserved, and even then this material was not as effective as the natural fruit.

The miraculin is present in the pulp and on the inner surface of the skin of the miracle fruit and in its natural environment is quickly deactivated especially when exposed to the air once the skin is broken at room temperatures. Furthermore, after the fruit has been picked, even prior to breaking the skin, the active material begins to degrade but at a slower rate than when the skin is broken. While the process by which degradation proceeds is not known exactly, it is now believed that certain enzymes and/or acids present in the fruit accelerate degradation in the presence of air at normal room temperatures, and apparently even at temperatures below the freezing point of water. It has been found that when the pulp of miracle fruit is frozen and subsequently lyophilized to form a granular or powder material, the product had to be refrozen in order to maintain the activity of the material that remained. Even when the pulp had been lyophilized, its effectiveness was not nearly as great, either on a weight basis or on a quality basis, as the active principle in the fresh fruit.

Accordingly, it would be highly desirable to provide a powdered form of miraculin-rich material from miracle fruit which would be both at least as effective as the natural fruit and stable for long periods of time, at room temperature without the use of special dry storage conditions. Such a product could be incorporated easily into food, used in conjunction therewith, or made into unit dosage forms such as tablets or capsules for oral application by humans, thereby providing practical forms of the taste-modifying agent.

The present invention is based on the discovery that miraculin is extremely stable when isolated from certain degrading enzymes and/or acids present in its natural state rather than being unstable as thought by the prior art. Thus, the present invention provides a form of the taste modifying miraculin that is stable at room temperatures indefinitely, and which is equally effective as the natural fruit in terms of quality response, and is more effective than the natural fruit on the basis of equal weights or volume.

The present invention provides a powdered or granulated composition derived from the miracle fruit berry having the characteristic of suppressing sour taste and accentuating sweet and salt taste, which is stable in powdered form at normal atmospheric conditions over extended periods of time of a year or more. The product is a stable white powder comprising miraculin either alone or admixed with material inert with respect to the characteristic of suppressing sour taste, but excluding components that degrade miraculin present in the pulp and skin of miracle fruit including the material containing acids and/or enzymes that degrade miraculin. The product, obtained by any one of the processes described below, exhibits remarkable stability in powdered form at room temperature. This is indeed surprising in view of the prior art which regarded miraculin as highly unstable and thermolabile such that it was thought necessary to maintain powdered concentrates in a frozen condition or in a dry atmosphere or to refrigerate solutions containing the active principle obtained by the prior art processes to retain the desired stability over reasonably long periods of time. In addition, it is surprising that the product of this invention enhances salt taste as well as sweet taste as this characteristic of miraculin was not known prior to this invention. Since the product of this invention is extremely stable, it can be used in applications for which the prior art products are not suitable. Thus, the product of this invention can be coated on foods to modify their taste without the necessity of special packaging or quick use. The prior art products are not useful in these applications due to their instability believed to be caused by the hygroscopic nature of the cellulosic components in the fruit. It is believed that the absorbed moisture actuates the enzymes and/or acid retained in the pulp even after dehydration thereby causing degradation of the miraculin.

In accordance with the process of this invention, a stable miraculin-rich composition is obtained by comminuting depitted ripe miracle fruit containing miraculin and then separating the vaporous and liquid components including acids and enzymatic components of the ripe fruit that degrade miraculin from the miraculin-rich material. The liquid and vaporous components are separated by dehydration and the enzymatic components are separated by any means that effects separation on the basis of density.

To minimize miraculin loss after picking, the whole fruit can be frozen to very low temperatures to await processing or the pulp and skin can be processed immediately after picking to obtain the concentrated miraculin. Comminution of the fruit serves to fracture the cell walls and thereby expose substantially all of the miraculin and facilitate subsequent processing. Dehydration can be effected in any convenient manner wherein low temperatures can be obtained including lyophilization, foam separation, spray drying or similar dehydration, processes and can proceed or follow the separation step based on density. It is preferred to separate the high density miraculin from the low density enzyme-rich material following dehydration because of the increased efficiencies obtained thereby. If the miraculin is not separated from the material containing the enzyme, the product is unstable and will be degraded quickly at normal room conditions so that it loses its taste-modifying effect. The miraculin-rich material, substantially free of the degrading enzyme and/or acids, has a substantially higher density than the material containing the enzyme. Therefore, the separation of the miraculin, that may contain some cellulosic material, from material containing the enzyme is effected by processes that separate materials on a density basis. To facilitate this separation, the mixed pulp and miraculin is preliminarily comminuted and screened to obtain uniformly small particle size.

The preferred process of this invention is based upon the discovery that degradation of miraculin in the fruit is initiated immediately after the ripe fruit is picked, and that degradation of the active principle in its natural environment is accelerated by increased temperature and by contact with air. Thus, it is preferred to process the ripe miracle fruit as quickly as possible, at as low a temperature as possible, and in as non-oxidizing atmosphere, to obtain a high yield of miraculin. Preferably, the picked fruit is washed in water and then depitted at about 1 to 4° C. The fruit can be stored in a frozen state to await processing or can be processed immediately to obtain the active principle. When stored, temperatures of about —40° C. or less are employed to arrest degradation since it has been found that degradation of the active principle in the frozen fruit occurs even when stored at temperatures of about —15° C. Since it is difficult to remove the pit or seed from the frozen berry, it is preferred to depit the berry prior to frozen storage. The depitted berry, regardless of whether it has been stored previously or whether it is processed directly after having been picked, is comminuted in a frozen state either alone or together with Dry Ice or ice formed from pyrogen-free distilled water. When the berry is processed immediately after having been picked, the pulp and skin obtained from the depitting step are directed into a container placed in a low temperature bath which itself may contain crushed Dry Ice. The pulp and skin are then comminuted at low temperatures such as by blending, grinding or ball-milling with ball milling in a shell freezer being preferred.

In addition to the lyophilization dehydration process described above any other form of dehydration commonly used in food processing can be employed as long as the temperature can be controlled and maintained low during dehydration. Suitable processes include the foam-drying process described in U.S. Pats. 2,967,109 and 2,995,046 wherein a minor portion of surfactant is incorporated with the food product and thereafter air or other non-toxic gas is bubbled through a thin layer of mixture. The brittle sponge-like product obtained then can be comminuted prior to separating the miraculin as described previously. Alternatively, a spray drying process can be employed wherein the comminuted pulp and skin is spray dried at low temperatures.

It is preferred to employ Dry Ice in the container receiving the pulp from the depitting step and during the comminuting step. The frozen carbon dioxide serves two important functions; it provides low operating temperatures in the order of —40° C. or less as well as a $CO_2$ rich atmosphere known to preserve vegetable matter. Also, since Dry Ice sublimes, it is readily separated from the frozen pulp.

The pulp is comminuted until the average particle size of the mixture is about 600 microns or less. It is preferred to comminute the pulp to a particle size on the order of 100–125 microns to insure breaking of substantially all of the cell walls. Preferably, the mixture then is lyophilized under vacuum at a temperature of about —40° C. or less to remove liquid and vaporous components to include certain organic acids such as formic acid. Freeze drying is continued until there is no significant weight change in the material over about a four hour period. At this point in the process, the dried pulp contains less than about 5 weight percent moisture. To remove the remainder of the liquid and volatiles from the pulp by lyophilization would require an inordinately long period of time. Therefore, it is preferred to complete the dehydration in a desiccator at normal room temperatures. The small concentration of moisture in the pulp during desiccation will not cause significant degradation of miraculin during the final drying period. The miraculin then is separated from the enzyme-rich material on the basis of density.

The separation of the miraculin-rich material from the enzyme-rich material is based upon the fact that the active principle is considerably more dense than the enzyme-rich material in the order of about 10 times as dense. Thus, the mixture of inerts and active material described above can be separated by any convenient density separation method including settling from a suspension of the mixture in liquid, the use of fluidizing bed technique, or through the use of cyclone type centrifuge. Some separation of miraculin-rich material from enzyme-rich material can be effected prior to dehydration by placing the comminuted pulp in settling pans at a temperature of 1–4° C. until the highest density material has settled in the bottom. The settling is complete in a short period of about 20 minutes with the miraculin-rich material forming the lowest layer which is then separated. The material then is frozen to below about —40° C. and dehydrated. The preferred separation method is conducted after dehydration and utilizes a cycline type centrifuge for dry powder following dehydration described in the examples. The miraculin-rich material has a density in excess of 1 g./cc. while the enzyme-rich cellulosic material has a density of less than about 0.5 g./cc. Since the high density material is white and the low density material is brown the separate layers can be easily and quickly identified on the basis of color. To obtain the desired product stability, enzyme-rich material concentration should be as low as possible with removal in the order of about 95% having been found to be adequate.

The active principle obtained by this invention is insoluble in water and only partially soluble in saliva. To be effective in suppressing sour taste and enhancing sweet and salt taste, the product must be applied to the sour taste receptors on the tongue. The miraculin-rich material can be applied conveniently as a powder or in a unit dosage form admixed with inert solids such as a tablet, capsule or gum, or coated on the unit dosage from or admixed with water or solvents for use as a liquid spray or the like. The active principle is retained on the tongue a sufficient period to contact essentially all of the sour taste receptors. When employed in unit dosage form, as little as about 0.1 milligram of miraculin with a product of small particle size are required to obtain the taste-modifying effect. Miraculin is employed in unit dosage forms in amounts of from 0.1 to about 50 milligrams, usually from 10 to 50 milligrams.

The following examples illustrate the present invention and are not intended to limit the same.

EXAMPLE I

Ripe miracle fruit berries are picked and washed at 1°–4° C. in a water-ice bath in an insulated container.

The fruit then is depitted at about 1°–4° C. in a juicer comprising a perforated cylinder housing a rotating brush extending along the cylinder length the ends of which contact the inside cylinder wall. During rotation, the brushes tumble and press the berries against the perforated housing causing the juice and pulp material to pass through the holes and leaving the pits in the cylinder. The juice and pulp flow into containers that contain Dry Ice and are immersed in an alcohol-Dry Ice bath. Crushed Dry Ice (solid $CO_2$) is added directly to the fruit pulp obtained from the depitting step, and the mixture is thoroughly ground in a ball mill to a particle size of less than 150 microns (#100 sieve size) while being maintained at a temperature of about −40° to −50° C.

The mixture then is placed in a freeze-drying flask, placed in a shell freezer, and allowed to come to thermal equilibrium at a temperature of about −55° C. The material is then connected to a freeze-dryer vacuum system with a refrigerated condenser for condensing liquids and condensable vapors, where it remains until there is no significant weight change in the material over a four hour period. The material is then removed from the flask and placed in a desiccator cabinet in trays at room temperature for further drying or storage until the moisture content is substantially zero.

After the powder is thoroughly dry, it is placed in a temperature controlled milling machine, where the average particle size is reduced preferably to less than about 150 microns. The material is periodically screened and that retained by the #100 sieve size is returned to the milling machine until it can pass the #100 sieve size.

The fine powder is introduced into a pneumatic cyclone-type separator, whereby the dense miraculin is concentrated near the inside wall and the cellulosic material is concentrated closer to the center of the cyclone. The mixture to be separated is introduced into the top of the cyclone and caused to move in a circular path down the inside wall. The miraculin-rich material is separated from the lower density material by a baffle located at the interface of the miraculin and lower density material. The lower density material is recycled until substantially all the miraculin is separated. The concentrated miraculin can be recycled if necessary, to achieve any degree of separation from the lower density material. The miraculin powder obtained from the cyclone separator is room temperature stable even when stored in the open atmosphere for at least about 8 months and can then be used to produce unit dose forms including tablets or aqueous sprays.

EXAMPLE II

This example illustrates a typical miraculin formulation a method for preparing chewable tablets therefrom and the results of tests on subjects ingesting the tablets.

The formulation used to make the tablets is set forth in Table I.

TABLE I

| Identification: | Amount, mg. |
|---|---|
| Lactose, direct tableting grade | 248.3 |
| Sorbitol, direct tableting grade | 80.0 |
| Flavoring | 7.0 |
| Coloring | 0.7 |
| Magnesium stearate | 13.0 |
| Per tablet | 349.0 |

The following procedure was carried out at a temperature of 68–75° F. with relative humidity of less than 50% to prepare the tablets. The ingredients set forth in Table I were mixed and blended with miraculin prepared as described in Example I at a concentration of 50 milligrams miraculin per tablet. The result of the mixture was screened to pass through a #20 sieve size. The tablets were made by pressing the formulation in a Stokes Rotary Tablet Press (B2) using a standard $12\%_{32}$ inch concave punch. The tablets had a hardness (Monsanto) of 3.0–3.5% kg. and weighed 399 milligrams.

The tablets were tested for their taste-modifying effects by a procedure that determined the apparent sweetness effected by a standard citric acid solution after ingesting the miracle fruit tablet and compared this sweetness to sugar solutions of varying concentration. Each subject rinsed his mouth for one minute with distilled water. The miracle fruit tablet then was thoroughly chewed for one minute. Then the subject rinsed his mouth with distilled water for thirty seconds and waited two minutes. The subject then tasted a standard solution comprising citric acid (.00926 M) which had a sourness equivalent of .01 M hydrochloric acid. After rinsing with the citric acid solution, the subject rinsed with distilled water for thirty seconds. After experiencing the sweetness of the citric acid solution, the subject was then required to compare the sweetness experienced with one of 11 standard sugar solutions. The sugar solutions had varying concentrations as follows: .1000 M, .1175 M, .1379 M, .1620 M, .1993 M, .2236 M, .2626 M, .3083 M, .3622 M, .4256 M, and .5000 M. The subject then was asked to write down which, if any, standard solution most closely compared to the sweetness experienced with the citric acid after taking the miracle fruit tablet The biological assay procedure indicates that the tablets are effective in substantially increasing the sweetness of the normally sour citric acid solution. Usually the citric acid is comparable in sweetness to either the 0.2626 M or 0.3083 M sugar (sucrose) solution.

Although there were 200 different subjects tested, several having used the tablet in their daily diet, approximately 95% found the tablet to be effective in causing the citric acid to taste sweet, in sweetening other sour tasting foods and enhancing the flavor of almost all types of fruits and vegetables tasted. After six months of storage in a glass bottle at room condition with no particular care being taken in handling and storing of the tablets to maintain them dry, the tablets were still stable and effectively modified taste.

What is claimed is:

1. A composition for suppressing sour taste and enhancing sweet and salt taste which retains its taste-modifying characteristics at normal room temperature for long periods, comprising particulate solid material rich in the taste-modifying principle of *Synsepalum dulcificum* Daniell for suppressing sour taste and enhancing sweet and salt taste obtained from the ripe fruit of *Synsepalum dulcificum* Daniell, which solid is substantially free of the components of the ripe fruit that degrade the taste-modifying principle.

2. The composition for oral ingestion comprising the composition of claim 1 admixed with a solid inert with respect to said taste-modifying characteristics.

3. The process for obtaining the composition of claim 1 which comprises comminuting and depitting the ripe fruit to rupture the cellular structure thereof, said ripe fruit being comminuted either within less than about 10 hours after being picked or at any time after being picked but being maintained at a temperature less than about 0° C. and separating the vaporous, liquid and certain enzymatic components of the ripe fruit from the material rich in the taste-modifying principle of the comminuted fruit, the certain enzymatic components being those that degrade the taste modifying principle.

4. The process of claim 3 wherein the vaporous and liquid components are separated from the taste-modifying principle by lyophilization.

5. The process of claim 3 wherein the depitted fruit is blended with a frozen vaporizable solid to maintain a reduced temperature during comminution prior to dehydration.

6. The process of claim 5 wherein the frozen solid is dry carbon dioxide.

7. The process of claim 3 wherein the depitted fruit is frozen to less than about −50° C. prior to comminution.

8. The process of claim 3 wherein the ripe fruit is maintained frozen at less than about −40° C. prior to comminuting the ripe fruit.

9. The process of obtaining the product of claim 1 which comprises depitting the ripe fruit of *Synsepalum dulcificum* Daniell, freezing the depitted fruit, comminuting the frozen fruit, dehydrating the comminuted fruit by lyophilization to a water content less than about 5 weight percent, desiccating the lyophilized fruit to remove most of the remaining free moisture, and separating the material rich in the taste-modifying principle from the lower density enzyme-rich component of the dried fruit, said freezing, comminuting and dehydrating steps being effected at a temperature less than about −40° C.

10. The process for obtaining the product of claim 1 which comprises depitting the ripe fruit of *Synsepalum dulcificum* Daniell, freezing the depitted fruit, comminuting the frozen fruit, dehydrating the comminuted fruit to a water content less than about 5 weight percent and separating the material rich in the taste-modifying principle from a component of the dried fruit rich in the enzymes thereof that degrade the taste-modifying principle, said freezing and comminuting steps being effected at a temperature less than about −40° C.

11. The process of claim 10 wherein dehydrating is conducted by lyophilization.

12. The process for obtaining the product of claim 1 which comprises depitting and comminuting the ripe fruit of *Synsepalum dulcificum* Daniell, said ripe fruit being comminuted either within less than about 10 hours after being picked or at any time after being picked but being maintained at a temperature less than about 0° C., separating a component of the ripe fruit rich in enzymes that degrade the taste-modifying principle from a component rich in the taste-modifying principle of the ripe fruit and dehydrating the separated material rich in the taste-modifying principle to a water content less than about 5 weight percent.

13. The process of claim 12 wherein the ripe fruit is maintained frozen at less than about −40° C. prior to comminuting the ripe fruit.

14. The process of claim 12 wherein the dehydration is conducted by lyophilization.

15. The process of claim 13 wherein the dehydration is conducted by lyophilization.

References Cited
UNITED STATES PATENTS

| | | | |
|---|---|---|---|
| 3,438,792 | 4/1969 | Kruger | 99—204 XR |
| 2,893,216 | 7/1959 | Seefeldt et al. | 99—197 XR |

OTHER REFERENCES

Inglett, G. E., et al.: "Taste Modifying Properties of Miracle Fruit," J. Agr. & Fd. Chem., vol. 13 (1965), pp. 284–287 and 197.

MORRIS O. WOLK, Primary Examiner

W. BOVEE, Assistant Examiner

U.S. Cl. X.R.

99—141 R, 193, 204

FO-1050
(5/69)

UNITED STATES PATENT OFFICE
CERTIFICATE OF CORRECTION

Patent No. 3676149           Dated    July 11, 1972

Inventor(s)     John R. Fennell & Robert J. Harvey

It is certified that error appears in the above-identified patent and that said Letters Patent are hereby corrected as shown below:

Column 1, line 52, after "is" insert -less-

Column 3, line 32, replace "proceed" with -preceed-

Signed and sealed this 28th day of November 1972.

(SEAL)
Attest:

EDWARD M. FLETCHER, JR.              ROBERT GOTTSCHALK
Attesting Officer                    Commissioner of Patents